United States Patent
Henig et al.

(10) Patent No.: US 12,482,088 B2
(45) Date of Patent: Nov. 25, 2025

(54) APPARATUS AND METHOD FOR TESTING THE QUALITY OF BICYCLE COMPONENTS

(71) Applicant: DT SWISS INC., Grand Junction, CO (US)

(72) Inventors: Andreas Henig, Biel (CH); Christophe Witschi, Bourrignon (CH); Martin Walthert, Aarberg (CH); Alexander Dillenz, Stuttgart (DE)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 18/628,333

(22) Filed: Apr. 5, 2024

(65) Prior Publication Data

US 2024/0354928 A1 Oct. 24, 2024

(30) Foreign Application Priority Data

Apr. 18, 2023 (DE) .......................... 102023109697.4

(51) Int. Cl.
*G06T 7/00* (2017.01)
*G01J 5/00* (2022.01)
*G01J 5/08* (2022.01)
*H04N 23/23* (2023.01)

(52) U.S. Cl.
CPC .......... *G06T 7/0004* (2013.01); *G01J 5/0859* (2013.01); *H04N 23/23* (2023.01); *G01J 2005/0077* (2013.01); *G06T 2207/10048* (2013.01); *G06T 2207/30108* (2013.01)

(58) Field of Classification Search
CPC ......... G06T 7/0004; G06T 2207/10048; G06T 2207/30108; G01J 5/0859; G01J 2005/0077; H04N 23/23; B60B 1/041; G01N 25/72
See application file for complete search history.

(56) References Cited

U.S. PATENT DOCUMENTS 6,570,175 B2 * 5/2003 Bales ................. G01N 21/8806
250/559.4

FOREIGN PATENT DOCUMENTS

| CA | 2267586 A1 * | 10/1999 | ............. G01N 25/72 |
|---|---|---|---|
| DE | 10 2012 101467 B4 | 10/2013 | |
| DE | 10 2019 124 344 A1 | 3/2021 | |
| DE | 10 2016 212 810 B4 | 4/2023 | |
| EP | 1992940 A1 * | 11/2008 | ............. G01N 25/72 |
| EP | 2 386 850 A2 | 11/2011 | |

(Continued)

OTHER PUBLICATIONS

Search Report received for German Application No. 102023109697.4, dated Sep. 6, 2023.

(Continued)

*Primary Examiner* — Michael Lee (74) *Attorney, Agent, or Firm* — Greer, Burns & Crain, Ltd (57) ABSTRACT

A facility and its use and method of examining the production quality of bicycle components with a control device, a heat source and a camera. The heat source applies heat on the bicycle component during a measuring process. The camera captures a spatially resolved thermal image of the bicycle component. The thermal image is evaluated to determine the production quality of the bicycle component. A deflecting device deflects heat radiation, to capture different sides of the bicycle component.

18 Claims, 6 Drawing Sheets

(56) References Cited

FOREIGN PATENT DOCUMENTS

| JP | 2766208 | B2 | * | 6/1998 |
| JP | 2007248394 | A | * | 9/2007 |
| JP | 101769243 | B1 | * | 8/2017 |
| JP | 2019158383 | A | * | 9/2019 |

OTHER PUBLICATIONS

Search Report received in European Application No. 24168074.3, mailed Sep. 16, 2024.
Usamentiaga, R., et al., "Nondestructive Evaluation of Carbon Fiber Bicycle Frames Using Infrared Thermography," Sensors, Art. 2679, No. 17, Nov. 20, 2017, 16 pages.

* cited by examiner

APPARATUS AND METHOD FOR TESTING THE QUALITY OF BICYCLE COMPONENTS

BACKGROUND

The present invention relates to a facility or apparatus, the use of a facility and a method of examining the quality and, in particular, the production quality of bicycle components. The invention is particularly suitable for assessing the quality of e.g. bicycle components and preferably of bicycle rims manufactured at least partially of a fibrous composite material.

Bicycle components manufactured at least partially of a fibrous composite material, tend to be manufactured in complicated manufacturing processes involving a plurality of manual steps. These include for example manually inserting, layer by layer, dry tissue layers or so-called prepregs into a mold. In doing this, an appropriate quantity of sections is draped so as to achieve the desired layer pattern. The mold tends to be closed and heated in a temperature-controlled device, so as to produce the bicycle component showing the desired component body.

In the case of bicycle components manufactured partially or completely manually or automated, it is desirable to inspect the production quality of the bicycle components manufactured. Nowadays, this involves as a rule optical inspection of each of the bicycle components, and bicycle components having outwardly visible defects are sorted out. In addition, bicycle components thus manufactured may at specific intervals be for example sawed open, for examining the internal structure of the bicycle component. This allows to detect systematic manufacturing errors. There is the drawback, however, that there is no continuous checking, so that in individual cases, errors cannot be detected or irregularly only.

For assessing the internal structure of a bicycle component, a non-destructive examination of the bicycle component by X-ray or computed tomography (CT) is possible. This provides for reliable inspection of the internal structure of the components manufactured. There is the drawback of considerable financial overhead and the time requirement, since a complete examination, for example, of a bicycle rim can readily require more than one day's work. This is why such an X-ray radiography is per se very advantageous, basically allowing controlling and inspecting the production quality of individual components by sampling items from the series or during the development of a prototype. Thus, e.g. in the case of bicycle components of fibrous composite materials, the layer pattern can basically be optimized. More extensive inspection is, however, too costly.

During series inspection one can, other than optically inspecting for surface defects, also capture the weights of each of the bicycle components, to detect any deviations from the desired values. On this basis, defective bicycle components can be sorted out. Likewise, the dimensions can be captured and compared against the desired values for inspecting the series quality.

DE 10 2016 212 810 B4 has disclosed a method and a measuring system for testing components in automotive engineering, wherein active thermography excites a car body component through an infrared exciter by thermal radiation. The spectral distribution of the thermal radiation of the infrared exciter is captured at the same time during warm-up by an additional sensor flush-mounted in a recess of the component, to include in the evaluation the spectral composition of the infrared exciter. Although the method is basically functional, it involves high complexity due to the additional sensors. Complex car body components must be examined from multiple sides, further increasing the complexity.

It is, however, desirable to reliably inspect the quality of bicycle components, involving little extra work while ensuring high quality.

SUMMARY

A facility or apparatus according to the invention is configured for inspecting the quality and, in particular, the production quality of bicycle components, and particularly preferably of bicycle rims. The facility comprises at least one control device and at least one heat source and at least one camera and preferably at least one thermography camera. The heat source is configured and set up to apply or supply heat during a measuring process (time-controlled) to at least one section of the bicycle component or of a component body of the bicycle component. The camera or thermography camera is set up and configured to capture and evaluate at least one spatially resolved thermal image of at least one subsection of the section of the bicycle component, so as to determine, or obtain a measure of, the production quality of the bicycle component, by means of analyzing the thermal image. Particularly preferably, at least one deflecting device is comprised, which is configured to deflect heat radiation to (simultaneously) capture different sides of the bicycle component. In the scope of this application, "simultaneous" is understood to mean "at the same time" or at least nearly at the same time. It is thus possible to simultaneously capture a side or part of an area of the bicycle component which is facing away from the light source respectively the heat source, and/or to capture part of an area which cannot be directly heated, illuminated or captured.

The facility according to the invention has many advantages. A considerable advantage of the facility according to the invention consists in that, by way of non-destructive application of heat by at least one heat source, respectively by targeted removing heat and corresponding manufacturing of a spatially resolved thermal image, a spatially resolved capture and analysis of the bicycle component is feasible. This results in a non-destructive determination of the production quality of the bicycle component. And it can be done from more than one side or direction.

Thus, it is basically possible to use the facility not only for inspecting the production quality of individual bicycle components from a bicycle component series, but it is also possible to capture the production quality of a majority or even a complete bicycle component series. Thereafter, the bicycle components thus inspected can be inserted with improved safety, since the quality (optionally of all the components in a series) was determined non-destructively.

In all the configurations it is possible to employ a (special) thermography camera for capturing a thermal image. Alternately it is possible to employ a conventional camera, which for example by way of using filters and/or using specific heat sources, is set up and configured to capture and evaluate spatially resolved thermal images of at least one subsection of a section of the bicycle component. Spatially resolved may, in particular, mean that the thermal image is presented resolved in lines and/or columns. Alternately, what is likewise feasible is, a vectorial representation or data of angles and distances for defining a spatially resolved thermal image.

Preferably, the camera is configured as a thermography camera or an infrared imaging camera. Particularly preferably, the thermal image reproduces the spatially resolved heat distribution (in the section) of the bicycle component or of a component body of the bicycle component. What is, in particular, represented by the pixel is, the intensity and/or the color of the picture elements (pixels), such as the RGB values, in dependence on the local temperature of the pixel on the bicycle component. It is thus possible to generate an image of the temperature distribution of the bicycle component. The fact that, given a defined heat input, the resulting temperature is related to the material thickness, drawing conclusions about the local material thickness. Thicker layers and larger masses heat up slower. Materials having a larger specific heat capacity also heat up slower. Hollow spaces act as isolators, reducing the thermal conduction and thus the heat distribution in bodies. Thus, a thermal image simultaneously reproduces an image of the distribution of the material thicknesses and the material distribution. Conspicuous spots may be an indication of air pockets or missing or surplus material input.

Compared against manufacturing radiographs, the facility and the method performed thereby, has many advantages. Although radiographing per se involves similar time requirements, a two-dimensional image is created which shows overlays. It cannot be seen at what depth there is a distinctive spot or a defect. Nor is it clear which body side has such a distinctive spot since e.g. when examining bicycle rims, both rim sides are shown in the radiograph. Moreover, a radiography system is considerably more expensive and requires protective measures in operation.

There are also considerable advantages compared to computer tomography (CT), which is another very precise method. A CT generates individual image slices of the cross section. This takes very much time. Several hours are required even for one single bicycle rim. Since bicycle rims may have defects anywhere on their component bodies, this method is less suitable and also more expensive, and many more data are generated which also require work for archiving.

The facility according to the invention makes very precise statements on the quality of a bicycle component and its component body. It may also be determined at what depth there is a conspicuousness or a defect. As a rule, air acts as an isolator in the thermal images, so that bicycle rims do not have any overlay of opposed rim sides. In a simple configuration, the absolute measuring time in the analysis of bicycle rims may be, less than three minutes or less than two minutes, or one minute or still less. The deflecting device also directly captures and analyzes the back face with one single recording. This will considerably save time. Moreover, this increases the security and quality, since both sides are analyzed with the same recording under identical conditions.

In the scope of this application, a "rim" is understood to mean a "bicycle rim". Particularly preferably, a hollow rim is designated, comprising a radially inwardly rim base and two lateral rim flanks, which are connected radially farther outwardly by a rim well. The rim base may be formed by the radially inwardly sections or areas of the rim flanks. In particular, is at least one hollow space provided between the rim flanks (and the rim base) and the rim well. As a rule, the rim base comprises spoke holes and preferably exactly one valve hole. The rim well can be configured closed (apart from one valve hole) or may comprise spoke holes or spoke nipple accommodations.

A thermography camera basically measures the infrared radiation and generates an image based on the surface temperature. Air in the component body is an isolator, having poor warming up. Here, the heat radiation of the surface is measured. Preferably, a computer and e.g. the control device assigns a specific temperature value to each point on the rim, which shows e.g. as a difference in colors and is stored in the thermal image. Given different material thicknesses, the different heat capacities show as differences in warming up and thus as inhomogeneous heat distribution, which is captured by the thermal image. Other than material thicknesses, different materials show as differences in the heat distribution in the component body. An (undesired) distribution of material types and material thicknesses can thus be detected as well.

For evaluation, preferred configurations preferably carry out (manual or automated) comparison against a reference component or a reference image. In the case of bicycle rims, the thermal image can be aligned to a standard e.g. by way of the valve hole or another distinctive spot or a specifically marked spot (sticker, imprint, RFID, optically recognizable edge or corner, optical pattern, etc.). Then, the thermal image or the reference image can be rotated to allow a correct comparison.

Error lists (in the control device or an assigned memory) serve for the facility to detect faulty bicycle components. Error lists can be updated manually and/or automatically. Any criteria/test or criteria/query features may be added e.g. in the case of errors not known thus far, subsequently showing a component in operation. It is also possible to manually or automatically add or remove test criteria (to/from the error list), e.g. if an automatically detected error is assessed as acceptable in the manual inspect.

In a preferred specific embodiment, the heat source comprises at least one radiation source. Particularly preferably, the heat source comprises at least one heat radiation device as a heat radiation source.

In all the cases it is also possible to introduce thermal power by way of thermal conduction. It is for example conceivable to first heat up a bicycle component homogeneously in a furnace, then to remove the bicycle component from the furnace according to plan, and following a defined time period, to establish a thermal image thereof. Due to the different material thickness distribution, some areas of the bicycle component will cool down faster than other areas, so that a thermal image derives a material thickness distribution. Particularly preferably, however, the bicycle component respectively at least one section of the bicycle component is heated up according to plan by introducing thermal power.

Preferably, a plurality of heat sources and particularly preferably, a plurality of quartz lamps is employed as heat sources. Using other heat sources is likewise conceivable. Thus, controlled heating up by laser light and/or thermal convection may be done. Quartz lamps are well suited for heat sources, since they allow controlled selection and efficient and precise controlling.

In all the configurations, the control device and at least one heat source or all of the heat sources are set up and configured to output a thermal power which periodically fluctuate respectively is/are provided for time-controlled variations. The thermal power corresponds to the intensity of the heat output and, in particular, the intensity of the heat radiation. The thermal power is provided for time control and variable for example within a predetermined frequency range or at a predetermined frequency.

In advantageous specific embodiments, at least one frequency of a variation of the thermal power output lies between 0.01 Hz and 10 Hz (or between 0.005 Hz and 20 Hz) and particularly preferably, the frequency of a variation of the thermal power output lies between 0.02 and 5 Hz. In advantageous configurations, the frequency may lie between 0.03 Hz and (approximately) 0.8 Hz. Other frequencies are likewise conceivable. A specifically advantageous frequency of the variation of the thermal power output is, in particular, related to the component examined. Differences may also result from the spots examined on a component and from their wall thicknesses and/or materials. Thus, a specific section or a specified range of a bicycle component may be examined at different frequency ranges than is another range or section of the bicycle component.

In all the configurations it is preferred for the control device to be set up and configured to perform the measuring process at least in two measuring sections (which differ in at least one parameter). Preferably, the thermal power in the two measuring sections is output in two different frequency ranges. Here, one of the frequency ranges has lower frequencies than does the other of the frequency ranges. This provides for examination of a section of a component body of a bicycle component, or an entire bicycle component, using different frequency ranges. Thus, the thermal power is varied in (at least) two different frequency ranges or frequencies during measurements.

It is possible for the frequency of the heat output in one or in two (or still more) frequency ranges to remain constant. Alternately it is possible for the frequency to (continuously) vary in one or both of the frequency ranges. In simple configurations, a (nearly) monotonous frequency is selected in a first frequency range and a second frequency range. A thermal power with different, variable frequencies in at least two different measuring sections, detects different features or characteristics of the examined bicycle component. Thus, each frequency or frequency range may be better suited for different wall thicknesses, material compositions or material structures. This is why (for sections of the component body) not only two, but further measuring sections may be used, employing different parameters.

It is also possible to assign different frequencies or frequency ranges to different heat sources. Preferably, the same heat sources are used for at least two different frequency ranges.

In particular is the control device set up and configured to generate periodically recurrent (and e.g. riffling intensity courses of the) thermal power of at least one heat source. The thermal power is in particular radiation intensities which are varied for example in riffles and preferably sinusoidally (cosinusoidally). Also possible is, a linear increase and decrease, and for example a triangular course of the thermal power. The power curve may be configured sawtooth-like. A real exponential increase followed by an exponential decrease over a given period is likewise possible. Also preferred is a course in which the heat output is periodically (e.g. once) switched on and (e.g. once) switched back off. It is also possible for the heat output per se to remain constant, but to be energized and de-energized at specific points or periods in time, for example by way of filters or switchable mirror elements or the like, so as to result in a periodically recurring course of the thermal power arriving.

In advantageous configurations, the facility comprises at least one (stationary) camera with spatially resolved sensors, which are, in particular, arranged in lines and/or columns. Thus, the camera may include matrix sensors comprising line sensors and column sensors. Also possible is to use a camera including a line sensor, provided for controlled pivoting to thus capture and image the entire section or the complete bicycle component.

In all the configurations it is particularly preferred for the camera to be light-sensitive in the infrared radiating area. Preferably, a thermography camera is employed, which is for example configured as an infrared camera device. Using filters is conceivable as well, wherein the filters then, in particular, transport the infrared component of the appearing light.

Preferably, a plurality of cameras is comprised. Two or more cameras may simultaneously capture the same or identical section (of the component body) of the bicycle component. It is possible and preferred for at least two cameras to (simultaneously) capture different subsections of the (component body or) section of the bicycle component. For example, with three or four cameras simultaneously capturing ⅓ or ¼ each of the examined surface of the bicycle component, the examination speed may be considerably increased (factor of 2, 3 or 4), which is highly advantageous, in particular, when examining bicycle components in series manufacture. Moreover, the precision can be considerably increased. The individual images can later be joined to form a product image.

Preferably, the measuring process involves taking a plurality of images and, in particular, thermal images, of which at least one and, in particular, exactly one evaluation image is derived in total (optionally per each product side). Preferably one (separate) evaluation image each is derived for each frequency range or for at least two frequency ranges. Thus, given two frequency ranges and two sides, four evaluation images may ensue. In all the cases, the evaluation images are, in particular, archived (permanently).

In preferred configurations, at least one deflecting device (for heat radiation) is comprised, which is configured to deflect heat radiation.

In particular at least one deflecting device is comprised for guiding heat radiation from the heat source to the component body, and preferably a side of the component body facing away from the camera. This specifically supplies heat not only to a side of the component body oriented toward the camera, but also to a rear side facing away, or a side oriented obliquely or transversely thereto. Alternately it is possible for appropriate additional heat sources to specifically emit heat "from behind" or "from beneath and/or above".

Particularly preferably, at least one deflecting device is comprised for guiding heat radiation from the component body toward the camera. This deflecting device deflects toward the camera, heat radiation directed e.g. "rearwardly", away from the camera. Then, particularly preferably the camera separately captures the front face and e.g. the back face and/or transverse side faces or inner surfaces oriented on the sensor surface. Thus, eliminating transporting or rotating the bicycle component, optionally one single image can capture and photograph the entire (relevant) surface of the bicycle component or the component body of the bicycle component. There is no need for multiple positioning and/or using multiple cameras (e.g. at offset angles). Multiple views can be represented/stored/evaluated in one image.

At least one deflecting device is preferably configured as a cone section or at least a cone frustum section.

In all the configurations, the control device and the heat source are preferably set up and configured to determine the production quality of component bodies of bicycle components at least partially manufactured of fibrous composite materials and/or at least partially of metallic materials. Individual ranges can be captured with adaptations. It is, in particular, possible to capture and evaluate the production quality of component bodies of bicycle components made of fibrous composite materials. Also possible is, evaluating the quality of bicycle components consisting partially of other materials or for example solely of metal or metallic materials. In the case of bicycle rims of light metal or other bicycle components, e.g. the quality of the welded joints can, in particular, be examined.

In all the configurations, (multiple) deflecting devices such as mirror units (in simple configurations, e.g. in the shape of polished steel sheets) may capture and analyze, by means of thermal images, a plurality or all of the sides of a component body or of an entire bicycle component. The mirror units are given specific shapes, or composed of multiple mirror elements which cover respectively generate the desired shape. For example, a cone-like shape may be used. A plurality of simple deflecting devices (configured plane or straight) may be joined to obtain e.g. a circle or cone or the like. Other shapes are likewise possible to enable on the whole, the desired views respectively the desired radiation.

For example, a side "A" of the bicycle rim may be oriented frontally toward the camera. Oriented mirror units (appropriately inclined) may simultaneously capture and analyze on a thermal image the rim well (side "B") and the rim base ("side C") and the opposite side. In the case of tubular frame components, mirror unit(s) can likewise capture multiple sides simultaneously. The quantity, shape and type of the mirror units depend on the specific configuration of the bicycle component.

It is possible and preferred to also deflect the heat radiation appropriately and to guide it toward the component body. Preferably, the same mirror units are used for deflecting the heat radiation and for reproducing the corresponding ranges. On the whole, processing may thus be accelerated. The throughput increases, and the unit costs decrease. Reliability is improved.

It is possible and preferred to manufacture, other than thermal images, also at least one "normal" image or photograph, with which to carry out automated evaluation of the optical impression of the bicycle component. Thus, the surface quality of the bicycle component can also be evaluated automated.

Manufacturing a multitude and, in particular, a plurality of thermal images during a measuring process, improves the evaluation precision, resulting in a more reliable and better reproducible evaluation. Moreover, the various images or thermal images may show variations of the pertaining properties, so as to enable considering and evaluating different aspects (in different evaluation images).

Preferably, the at least one evaluation image is stored in a memory device and is assigned to the bicycle component unambiguously and, in particular, permanently. The memory device may be provided locally in the control device. Alternately it is possible to store in a central memory the evaluation image or the evaluation images of a bicycle component respectively the evaluation images of multiple bicycle components. Then, these images can be accessed even after an extended period. For "analyzing" different spots, different images are preferably generated and overlapped. Very fast clarification of multiple questions is possible.

In all the configurations the control device is preferably set up and configured to capture images and, in particular, thermal images at points in time in which the radiation intensity or the thermal power of the heat source is lower than an average radiation intensity or thermal power during the entire measuring process, or during a measuring section of the measuring process. For example, a thermal image may as a rule be taken whenever the emitted thermal power is minimal or nearly minimal. This increases the meaningfulness. As a rule, good times are, in particular, in, or just before or just after, the minimum (e.g. +/−10% of the periodic time).

In advantageous configurations, a spatially resolved local wall thickness of the bicycle component is represented in the evaluation image by way of the intensity and/or color of the image pixel.

Preferably, the facility is configured and set up to determine (spatially resolved) temperature profiles on the component body of the bicycle component and to determine (spatially resolved) (assigned) phase shifts (or the pertaining spacing or phase difference) of the corresponding temperature profiles relative to the course of the radiation intensity of the heat source.

In all the configurations it is preferred that at least one holding device for the bicycle component is comprised, for defined takeup of the bicycle component for the measuring process. This enhances reproducible conditions. Particularly preferably at least one actuator is comprised, with which to automatically position the bicycle component or at least one component body, and/or with which to position the bicycle component in various positions, to capture different ranges or sides of the bicycle component. Preferably, automatic positioning (and e.g. rotation or linear displacement) may be carried out to first examine one side and thereafter the other side of the bicycle component. It is also possible to perform continuous rotation and/or displacement for specific examination of the bicycle component on all sides, or for example to take a measurement at a higher resolution. For better resolution of the image taken, incremental rotation around an axis of symmetry is conceivable.

Preferably, at least one (automatic) feeding device and at least one (automatic) delivery device for bicycle components is comprised, to enable automatic processing and analysis.

For analysis, for example a weighing device may be assigned for (automated) capturing of the weight of the bicycle component. This also results in conclusions on the quality and sorting out defective bicycle components.

In all the configurations it is possible and preferred that an encoder is comprised. Such an encoder may serve for detecting an encoding. It is also possible for an encoder to be configured for applying an encoding. Thus, it is possible for an encoder to apply on the bicycle component a unique encoding (e.g. in the form of a serial number). Particularly preferably, an encoder identifies a unique encoding of a bicycle component. Then, the encoder may also be denoted an encoding detection device or encoding detector. In this way the evaluation images and an evaluation result can be unambiguously assigned to the bicycle component. Thus, the measurement result can be accessed at a (much) later time, for example if damage occurs, even many years later. This data may also be utilized to optimizing and improving the production, to simplify or optimize the production, or to avoid defects found later. Long-term examinations are possible. This does not necessarily require exact assignment. A batch number may also be helpful.

In all the configurations, the facility is preferably set up and configured to examine the production quality of bicycle rims and to capture at least the (nearly) entire side surfaces of the bicycle rims. The side surfaces are, in particular, examined completely.

In preferred configurations, (at least) four cameras are used, each examining the rim segments of approximately 90° (high-resolution). The cameras examine not only the side walls but also the rim bases and the rim wells. Also conceivable is the use of a central camera and a rotating device for examining e.g. the rim base or the rim well, to specifically examine not only the rim flanks, but also the rim base and/or the rim well.

Also possible is, to use two or more cameras which are oriented obliquely toward one another and which capture a thermal image of the examined bicycle component from different angles.

Preferably, multiple thermal images are taken, the thermal powers of which are varied at multiple frequencies. The thermal images taken are set off, in particular, for each frequency against (at least) one overall picture or (exactly) one evaluation image. This is preferably followed by an automatic analysis, wherein an automatic comparison is done by way of a "set-point image". This results in automatic detection of quality levels and automatic sorting out of bicycle components not meeting requirements. It is also conceivable to derive from the total of different frequency ranges, a single evaluation image. Different colors may be assigned to the different frequencies. Preferably, a separate evaluation image is created for each frequency range, which then, in particular, represents a certain structural depth.

It is possible to range the bicycle components in various quality levels, so that particularly high-quality bicycle components can be selected for specific requirements. At any rate, faulty bicycle components are sorted out. The fact that all the series components can be evaluated separately, considerably improves, and moreover also guarantee, the quality.

Also, quality evaluation is possible of bicycle components which do not, or only partially, consist of fibrous composite materials. An examination of other materials is likewise possible. In the case of bicycle rims consisting (partially) of light metals, the material can be examined in its entirety, preferably also including the butt connection (weld joint). Thus, e.g. the weld joint or the positioning of connection members inserted may be inspected.

The applicant reserves the right to claim the use of a facility or apparatus for inspecting the production quality of bicycle components having at least one component body. The facility comprises at least one control device, at least one heat source, and at least one camera, and, in particular, at least one thermography camera. The heat source is configured and set up to apply heat to at least one section of the component body or the bicycle component during a measuring process (time-controlled and targeted). The camera is set up and configured to capture and evaluate at least one spatially resolved thermal image of at least one subsection of the section of the bicycle component, to determine (by analyzing the thermal image) the production quality of the bicycle component. A deflecting device deflects, in particular, heat radiation to (simultaneously) capture different sides of the bicycle component.

The method according to the invention serves for inspecting the production quality of bicycle components having at least one component body, wherein at least one heat source supplies heat to at least one targeted section of the bicycle component. At least one camera and, in particular, at least one thermography camera captures at least one thermal image of at least one subsection of the section of the bicycle component. The thermal image is evaluated to determine the production quality of the bicycle component. Preferably, (at least) one deflecting device deflects heat radiation to capture different sides of the bicycle component (in particular simultaneously).

The use of a facility and the method according to the invention also have many advantages. Using the facility and the method are, in particular, very advantageous for inspecting the production quality of bicycle components which are at least partially manufactured of fibrous composite material.

Preferably, a periodically variable thermal power is applied on the section (of the component body) of the bicycle component. In particular, is an undulated and/or periodically variable heat radiation applied on the section (of the component body) of the bicycle component. For example also by flash lights.

Preferably, a periodically variable heat radiation is applied, in a first range and thereafter, in a second, different, frequency range, on the section (of the component body) of the bicycle component. Preferably, thermal images are periodically taken and stored in a buffer. In particular, is an evaluation image for the production quality of the bicycle component derived from the thermal images (for each of the frequency ranges).

In all the configurations it is preferred to determine, for different locations or spots, a (spatially resolved) temperature profile each, on the component body of the bicycle component. Phase shifts of the temperature profiles pertaining to the course of the radiation intensity of the heat source are determined (spatially resolved) in the pertaining locations or spots. Basically, the larger the phase shift (the phase difference), the higher is the local heat capacity and (in known materials) the wall thickness. The smaller the phase shift (or the distance), the smaller is the wall thickness. Basically, the intensity course may be evaluated as well.

Basically also, the higher the maximum of the temperature profile, the smaller is the wall thickness (heat capacity). If the heat capacity or local wall thickness is higher, then the local temperature maximum of the temperature profile will be lower. In this respect, the profile of the temperature maxima may also be referred to for evaluation.

As a rule, results from evaluating the phase shifts are more precise, since they are less susceptible to failure. An air draft through an opened door or from unexpected movement in the room can influence the absolute level more than does a phase shift. Combined evaluations are likewise possible.

In a preferred configuration, the intensity of an image pixel in the evaluation image is dependent on the phase shift. A larger (smaller) wall thickness may be represented by paler (darker) colors or higher intensities, or reversely.

In the evaluation image, a local wall thickness of the bicycle component is preferably represented by at least one parameter of the image pixel. At least one parameter may be, the intensity of the image pixel and/or the color of the image pixel. Preferably, the wall thickness and parameters of the image pixel are assigned unambiguously.

In all the configurations it is possible to examine rims, frame parts, forks, spokes, handlebars, and/or attachments.

The invention also relates to a bicycle component comprising at least one component body, wherein the production quality of the component body or the bicycle component is determined by one of the methods described above, and/or by way of using the facility described above.

A bicycle component according to the invention comprises at least one component body, whose production quality has been inspected by means of a method described above. The bicycle component and/or the component body, in particular, includes an encoding (mechanical, optical, electronic), to which an evaluation image is unambiguously assigned. The evaluation image may be stored remotely in a memory (in the internet, a host computer, or in the cloud)

together with the encoding or a pointer, or it may be stored locally in the memory of the bicycle component.

In preferred configurations, the component body is at least partially manufactured, or consists at least partially, of a fibrous composite material.

Further advantages and features of the present invention can be taken from the exemplary embodiments which will be discussed below with reference to the enclosed figures.

BRIEF DESCRIPTION OF THE DRAWINGS

The figures show in.

DETAILED DESCRIPTION

Figure 1:
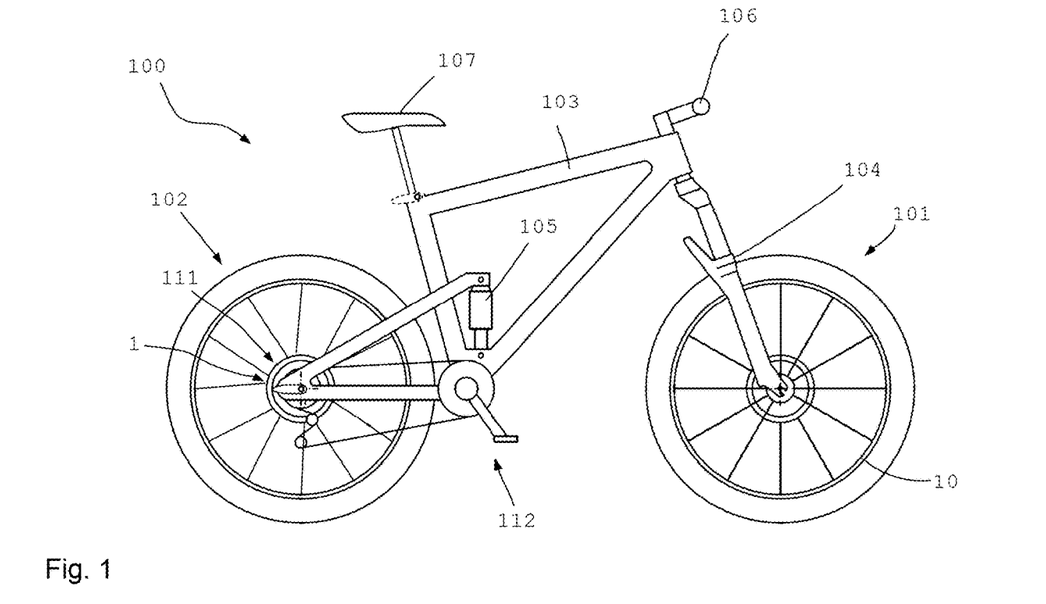
FIG. 1 a schematic illustration of a mountain bike.
Figure 2:
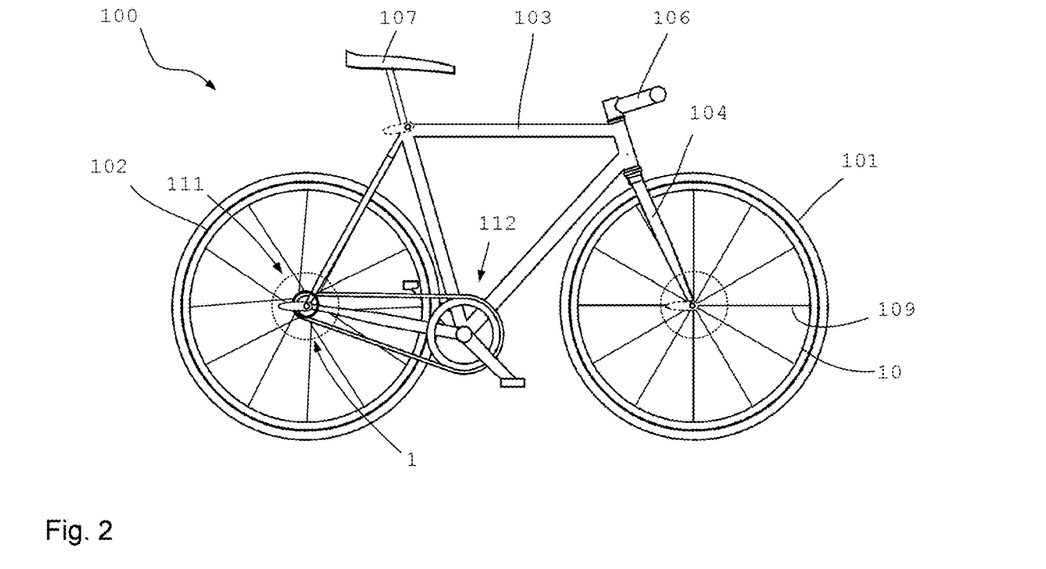
FIG. 2 a schematic illustration of a racing bicycle.

The FIGS. 1 and 2 show a mountain bike respectively a racing bicycle 100, each equipped with bicycle components 1 according to the invention. The mountain bike or racing bicycle 100 is provided with a front wheel 101 and a rear wheel 102. Both the front wheel 101 and the rear wheel 102 have rims 10 as bicycle components 1 according to the application. Basically, other bicycle components of the mountain bike or racing bicycle 100 can be manufactured correspondingly and evaluated as regards the production quality.

The two wheels 101, 102 are provided with spokes 109. A sprocket device 111 is provided. Basically, conventional caliper brakes or other brakes such as for example disk brakes may be provided.

A bicycle 100 comprises a frame 103, a handlebar 106, a saddle 107, a fork or suspension fork 104, and in the case of the mountain bike, a rear wheel damper 105 may be provided. A pedal crank 112 with pedals serves for driving. Optionally the pedal crank 112 and/or the wheels may be provided with an electrical auxiliary drive. The hub of the wheels may be attached to the frame by means of a clamping mechanism such as a through axle or a quick release.

Basically, the entire frame may be a bicycle component 1 according to the application. Alternately, the frame may be composed of multiple tubes configured as bicycle components 1 according to the application. The handlebar 106 and/or the fork 104 may likewise be configured as bicycle components 1 according to the application. The quality of each of the parts and bicycle components 1 may be captured and monitored separately.

Figure 3A:
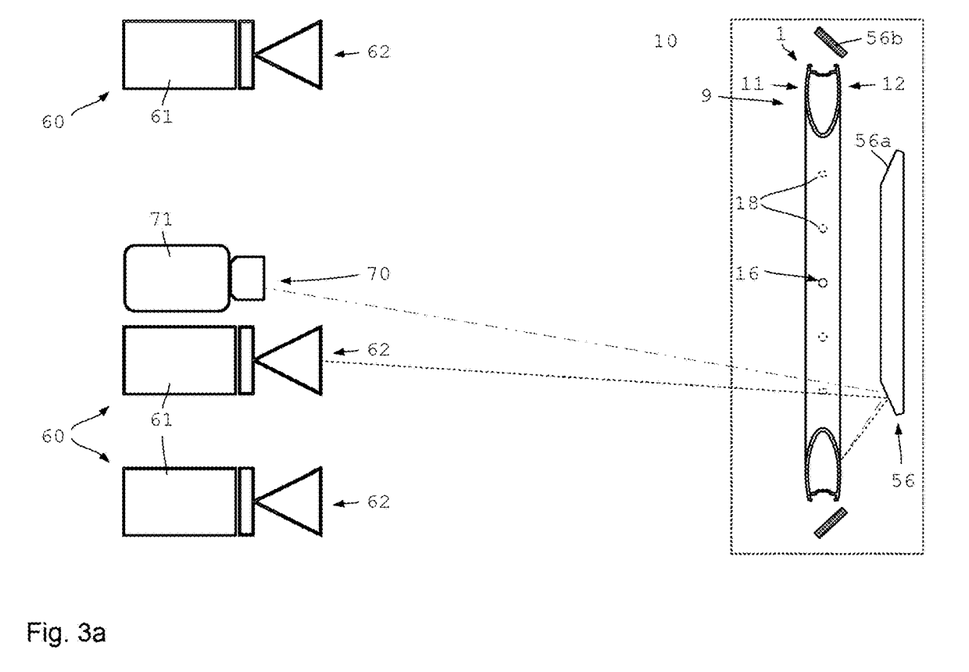
FIG. 3a a schematic illustration of a facility for inspecting the production quality.

FIG. 3a shows a simplistic top view of a facility 50 for evaluating the production quality of rims 10 or other bicycle components 1 comprising a component body 9. The facility 50 has multiple heat sources 60, which are configured as radiation sources 61 and, in particular, as quartz lamps 62. Cameras 70, shown as thermography cameras or infrared cameras 71, capture at least a part, a section or an entire side of the rim 10 as a bicycle component 1. A deflecting device 56 also inspects and documents a side facing away.

The bicycle component 1 is schematically illustrated in section on the right. The rim 10 may be provided with a valve hole 16 and spoke holes 18. In the orientation shown, the camera 70 can capture the rim sides 11 and 12 of the rim 10. Rotation of the rim for inspecting the other rim side 12 is not required.

For examining the production quality, thermal power, and presently heat radiation from the quartz lamps 62, is applied on the rim 10. The thermal power of the heat sources 60 is varied periodically. At points in time of lower thermal power, the camera 70 creates thermal images 75, which are evaluated for checking the production quality of the rim 10.

The facility 50 enables an improved utilization and high throughput. To this end, at least one deflecting device 56 is provided, which may comprise e.g. a mirror unit 56a or multiple mirror units 56a, 56b. The deflecting device 56 deflects the rays 58 from the heat source 60 by means of the mirror unit 56a onto the back face 12 of the rim 10, so that targeted, controlled heat radiation 63 from the heat source 60 can be applied, other than to the (front) rim side 11, also to the (back) rim side 12. The same or another deflecting device 56 in turn deflects heat radiation (rays 59) from the back side to the camera 72, so that it does not only take a thermal image of the front side 11, but simultaneously also of the back side 12. The images are disposed on the sensor locally offset, so as to reproduce the front and back sides (and optionally the top side and bottom side etc.) simultaneously, offset to one another, on one single sensor image. This increases the throughput and decreases the work. Furthermore, the deflecting device 56 may comprise a mirror unit 56b or multiple mirror units 56b segmented over the circumference, irradiating and/or capturing the rim well from the outside, and optionally the rim flanges from the inside.

Figure 3B:
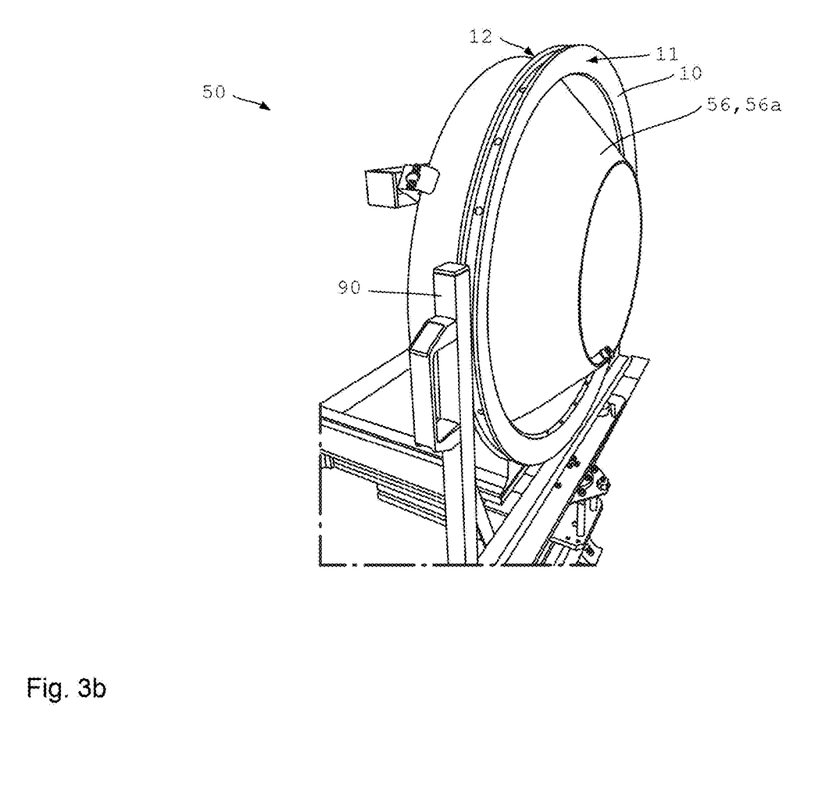
FIG. 3b a schematic illustration of a bicycle component and a deflecting device of a facility for inspecting the production quality.

FIG. 3b shows a schematic perspective illustration of a bicycle rim 10 and a deflecting device 56 of a facility 50 for inspecting the production quality of bicycle rims 10. The bicycle rim 10 is received on a holding device 90, and the mirror unit 56a of the deflecting device 56 results in simultaneous inspection from both sides 11 and 12.

Figure 3C:
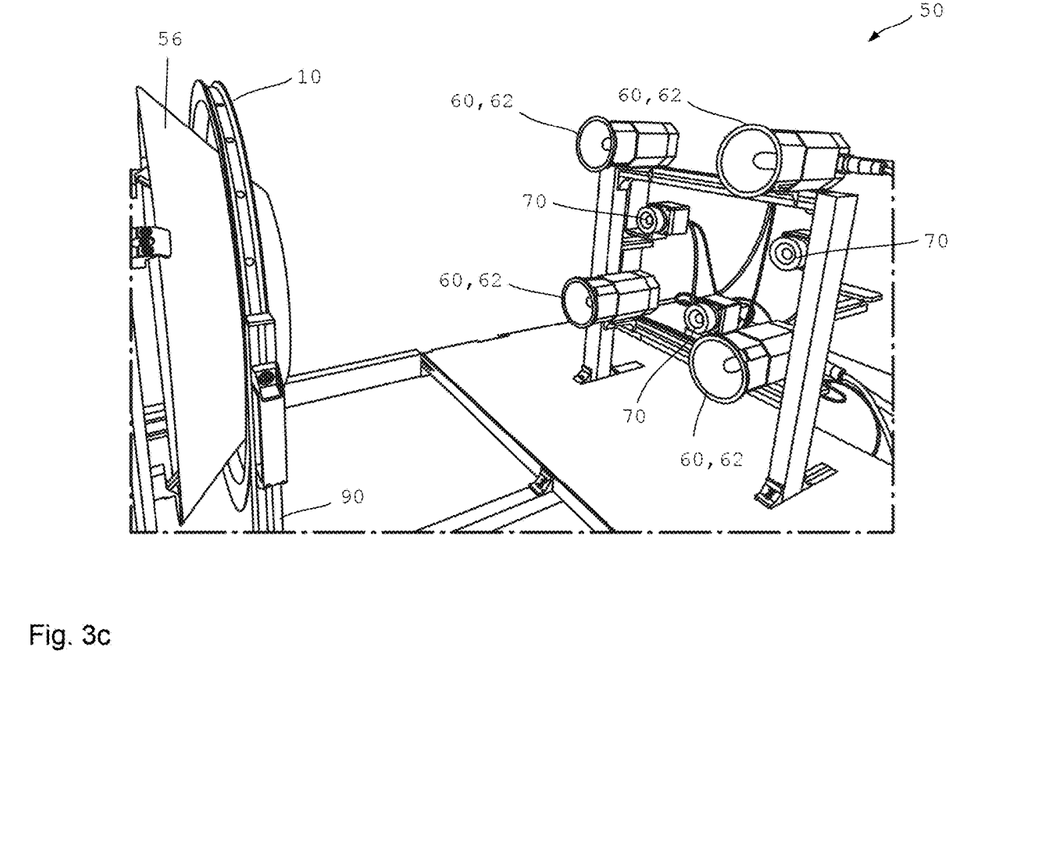
FIG. 3c a perspective view of the facility according to FIG. 3b.
Figure 4:
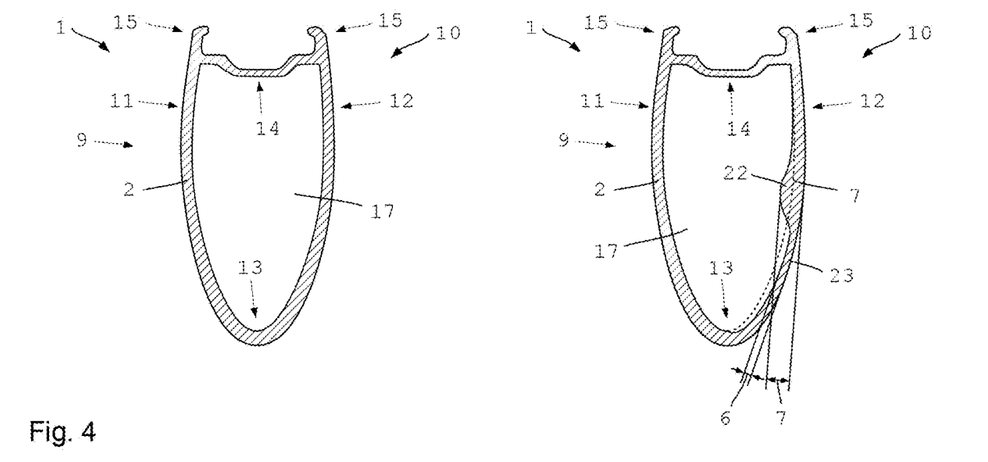
FIG. 4 two schematic cross sections of bicycle components.

FIG. 3c shows the entire facility 50 according to FIG. 3b in a perspective view, also showing four heat sources 60 in the form of quartz lamps 62, and three thermography cameras 70, which simultaneously record images of the front face and the back face of the bicycle rim 10. The mirror unit 56a of the deflecting device 56 also reflects part of the heat radiation of the quartz lamps 62 onto the back side 12 of the bicycle rim. The heat radiation further reflected off, is (presently) reflected by the same mirror unit 56a and impinges on the thermography camera(s) 70. Multiple heat sources 60 may increase the total power and/or may be oriented at separate subsections. Multiple thermography cameras 70 capture separate subsections, and/or to increase the quality respectively accuracy of the thermal images. FIG. 4 shows two schematic cross sections of a rim 10 as the bicycle component 1, wherein the bicycle component 1 shown on the left and its component body 9 show a high production quality. The shape and the wall thicknesses and the hollow space 17 are configured as desired. This rim may be used for creating a reference image.

The rims 10 each have rim sides 11 and 12, a rim base 13, a rim well 14 and rim flanges 15. A hollow space 17 is configured in the interior. The rim 10 shown consists entirely of fibrous composite material 2. Alternately it is possible for some parts or components of a bicycle rim 10 or a bicycle component 1 to contain other materials as well.

In the case of a hollow rim, as shown on the left in FIG. 4, the air tube used in manufacturing may be removed for example through the valve hole 16.

FIG. 4 shows on the right, a faulty rim 10, where a comparison to the image on the left clearly shows that the wall thickness 6 of the component body 9 is considerably thinner than desired, in a thinner spot 22. The thicker spot 23 shows a wall thickness 7 that is considerably larger than provided. These differences highly restrict the stability under load.

A targeted, periodic heating of the rim side 12, on the right, by means of the heat sources 60 from FIG. 3, applies a homogeneous heat input across the surface. Due to the differences in the wall thicknesses (higher heat capacity), however, even a homogeneous heat input results in an inhomogeneous heating of the rim side 12 on the right. This can be captured and documented by means of a thermal image 75 (see FIG. 5). With short-term irradiation, thicker wall spots are heated up less than are thinner wall areas. Thus, information about the structure of the bicycle component 1 is lodged in the thermal image.

An (automated) comparison thus (automatically) determines the quality or production quality of the bicycle component 1. Bicycle components 1 showing insufficient quality may be sorted out. All the bicycle components 1 may be sorted in two (usable/non-usable) or in more quality levels.

Figure 5:
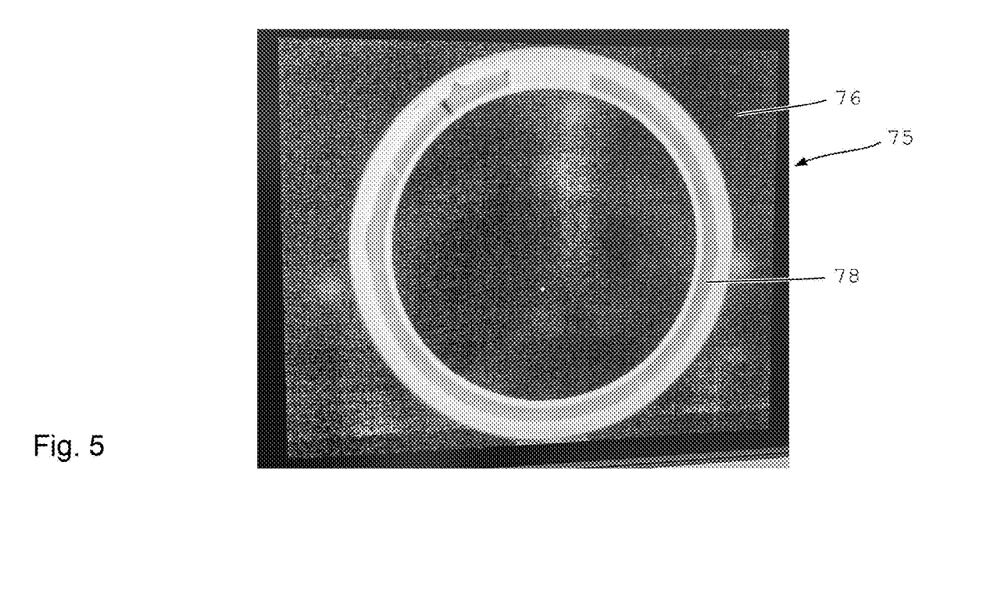
FIG. 5 an evaluation image of a bicycle component.
Figure 6:
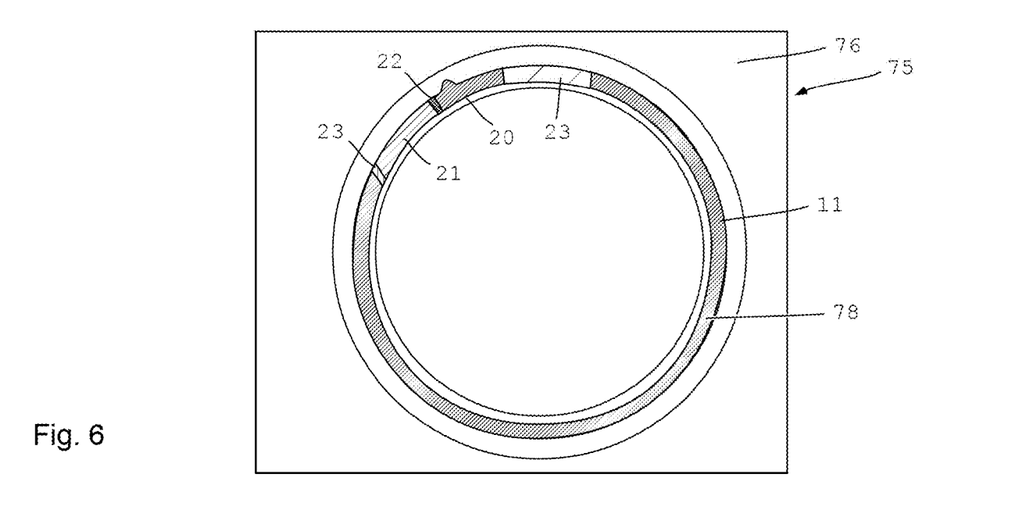
FIG. 6 a graphic representation of the evaluation image of a bicycle component.

FIG. 5 shows a real evaluation image of a rim 10 as a bicycle component 1. Beneath, FIG. 6 shows virtually the same evaluation image in the shape of a line drawing. It can be clearly seen that a faulty sample of a rim 10 was examined.

In the photo shown in FIG. 5, pale spots in the image of the rim 10 are representative of a larger wall thickness, while darker spots indicate a lower wall thickness. It can be clearly seen that a central area on top shows an area 23 having a larger wall thickness. Likewise, there is a paler spot in an area on the top left, indicating a thicker wall spot 23. A clearly darker spot 22 in the area of the hollow space indicates a thinner spot 22, where the wall thickness 6 is thinner. The corresponding segment 21 (prepreg part) has apparently been faultily placed slightly offset, so that a too large wall thickness has formed on the edges of the segment 21 on one side in the area 23, while in the area 22 there is a thinner spot where the wall thickness does not meet the quality requirements.

Figure 7:
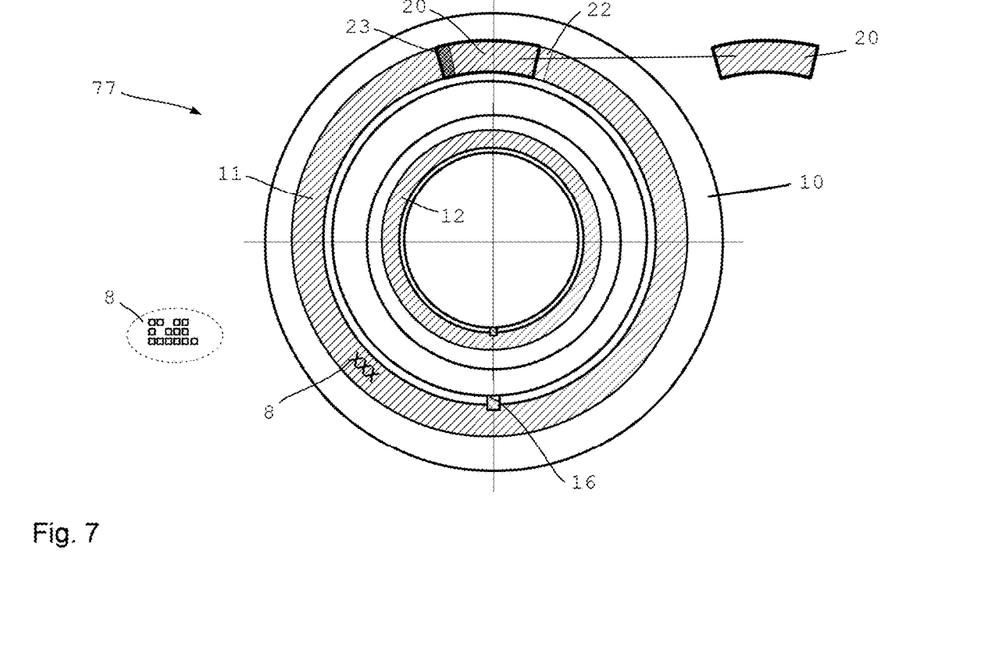
FIG. 7 another schematic, graphic representation of an evaluation image of a bicycle component.

FIG. 7 shows another schematic evaluation image 77, which is composed of multiple thermal images 75 and has been prepared for evaluation. For clarification, a segment 20 of a prepreg or a fibrous fabric to the right thereof is illustrated, which was faultily placed on top in the central area of the rim 10. Thus, a thinner spot 22 shows on the right end of the segment 20, while the other end of the segment 20 has a thicker spot 23. While the area of the larger wall thickness 23 does not adversely affect the stability as a rule, the thinner spot 22 may lead to danger in operation. An additional segment may form a thicker spot and thus may result in mass imbalance.

In a rim, the required stability must be guaranteed over the entire circumference of the side face, since the rotary motion of the wheel regularly stresses each spot on the circumference correspondingly. This is why for manufacturing high-quality bicycle components, automated production quality checks of rims are very advantageous.

FIG. 7 also schematically shows an encoding 8, for example on a side face of the rim, providing for a type code and optionally even a precise identification (serial number) of the exact bicycle component 1. Such encoding may comprise letters, numerals, patterns, and the like. Also possible is encoding 8 by way of a point pattern (dot code), as it is schematically shown to the left of the figure. Such encoding 8 may be directly stamped on, incorporated, or glued on. An adhesive label may e.g. stuck on as or before the rim enters the facility. Such adhesive label may include a QR code. Alternately, an RFID chip may be placed, e.g. in the interior of the component body or in the interior of the bicycle component 1.

The valve hole 16 can be seen in the bottom area of the FIG. 7. It may serve for orientation and unambiguous angular alignment of the thermal images. Optionally, a hole for removing the tubular film may be used for orientation. Other holes or specific spots or recognition features may be utilized for orientation. Alignment is conceivable physically and/or digitally (in the case of image recognition).

Spoke holes 18 may be provided, or they can be inserted after the production quality checks.

In the inside area of FIG. 7, the back side 12 of the rim 10 can be seen, which was simultaneously inspected and mapped by deflecting devices 56. It can also be seen that the back side 12—unlike the front side 11 illustrated farther outwardly—shows a flawless production quality. The flaw in the layer pattern recognizable on the front side 11 is not present on the back side 12. Still, this rim 10 is unusable due to the flaw on the front side 11. These kinds of single manufacturing flaws are also reliably detected.

The mirror units 56a, 56b better utilize the sensor surfaces, which are rectangular as a rule. Moreover, the measuring speed can be enhanced.

Figure 8:
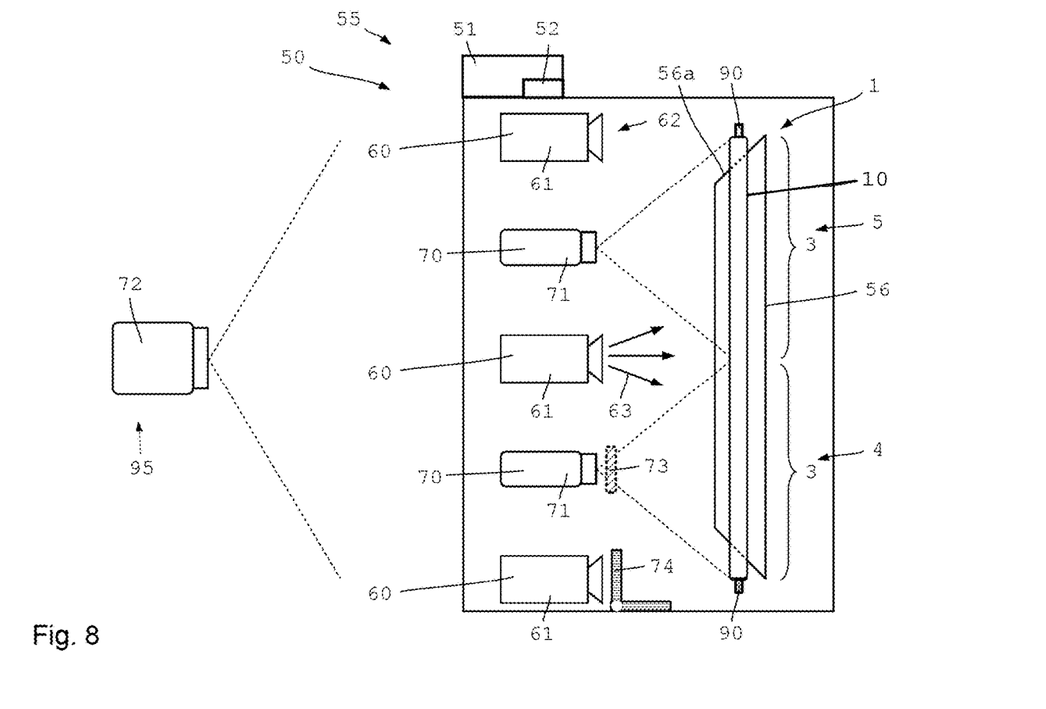
FIG. 8 a schematic representation of a facility for inspecting the production quality of bicycle components.

FIG. 8 shows a variant of the facility 50, in which a rim 10 as the bicycle component 1 is inserted schematically. The control device 51 shown comprises a memory device 52, in which the evaluation images and optionally also the individual thermal images are stored.

The heat sources 60 shown are preferably again configured as radiation sources 61 and, in particular, quartz lamps 62, and oriented toward the examined bicycle component 1.

Cameras 70, configured, in particular, as infrared cameras 71, detect various subsections 4, 5 of the section 3 of the bicycle component 1. It is possible for the bicycle component 1 to include multiple and/or differently configured sections 3. Alternately it is possible for the section 3 to comprise the entire bicycle component 1. Then, the entire bicycle component 1 can be captured at the same time.

The bicycle component 1 is retained by a holding device 90 which retains the rim 10, as shown radially from the outside. It is also possible for the holding device 90 to comprise at least one gripper or to be configured as an actuator 91, with which to supply and remove the bicycle component 1, optionally automatically.

FIG. 8 also shows on the left, a camera 72, representing an encoder or an encoding detector 95. This camera, which may be light-sensitive substantially (or solely) in the normal visual range of the spectrum (e.g. wavelength range of 400 nm to 700 nm, or 400 nm to 1000 nm), can capture for example the encoding 8 of the bicycle component 1, so as to obtain an unambiguous assignment of bicycle components and evaluation image(s), if the assignment is not unambiguous already. Optionally, an adhesive strip provided with the unambiguous encoding 8 is applied on the bicycle component 1. Thus, the bicycle components cannot only be subdivided in the categories "good" and "bad", but the assessment and the images can be permanently stored and unambiguously assigned.

Preferably, the camera 72 is light-sensitive in the infrared range, and it may be photosensitive to wavelengths of up to 3 µm or up to 10 µm or 15 µm. It is possible to filter out part of the visible spectrum or the entire radiation component in the visible part of the spectrum. The resolution and measuring accuracy can thus be increased, since adulterating radiation parts are blocked.

FIG. 8 shows additional variants wherein e.g. at least one filter unit 73 is placed in front of the camera 72, to apply to the camera 72 only the relevant and significant parts of the radiation spectrum. This optionally employs a standardized camera, which is sensitive in multiple wavelength ranges. Radiation having wavelengths which may adversely affect the measurement, is then filtered out.

Furthermore, FIG. 8 schematically shows a variant in which the mirror elements 74 are disposed in front of the heat sources, so as to ensure e.g. by pivoting the mirror elements 74, targeted application of heat radiation on the bicycle component 1. Pivoting the mirror elements 74 enable quickly and reliably "switching on" and "switching off" the heat radiation. This is why the mirror elements 74 are indicated in two pivot positions.

The mirror elements 74 may be disposed such that they reflect the heat radiation in the "switched-off" state to the side, and in the switched-on state, they forward it virtually unperturbed or deflect it in the desired direction.

Figure 9:
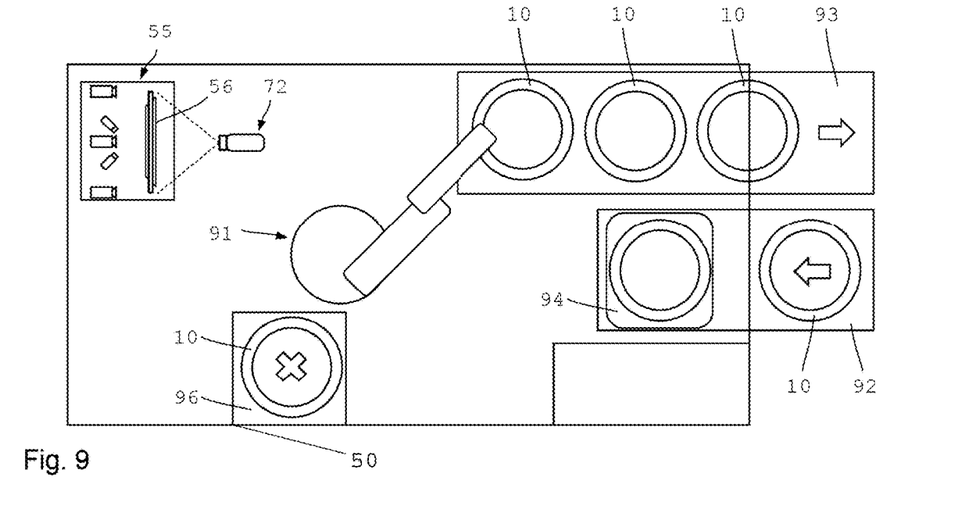
FIG. 9 an automated facility for inspecting the production quality of bicycle components.

FIG. 9 shows an automated facility 50, in which a feeding device 92 supplies the rims 10 or bicycle components 1 automatically. A weighing device 94 weighs the bicycle component 1. Thereafter, the actuator 91 takes the bicycle component 1 along to the measuring device 55 where it is automatically positioned. There it is automatically measured.

Sufficiently good bicycle components 1 are discharged by means of the delivery device 93. Bicycle components 1 not meeting the quality requirements are taken to the reject storage 96, where they are for example stacked for later further examination or recycling.

Figure 10:
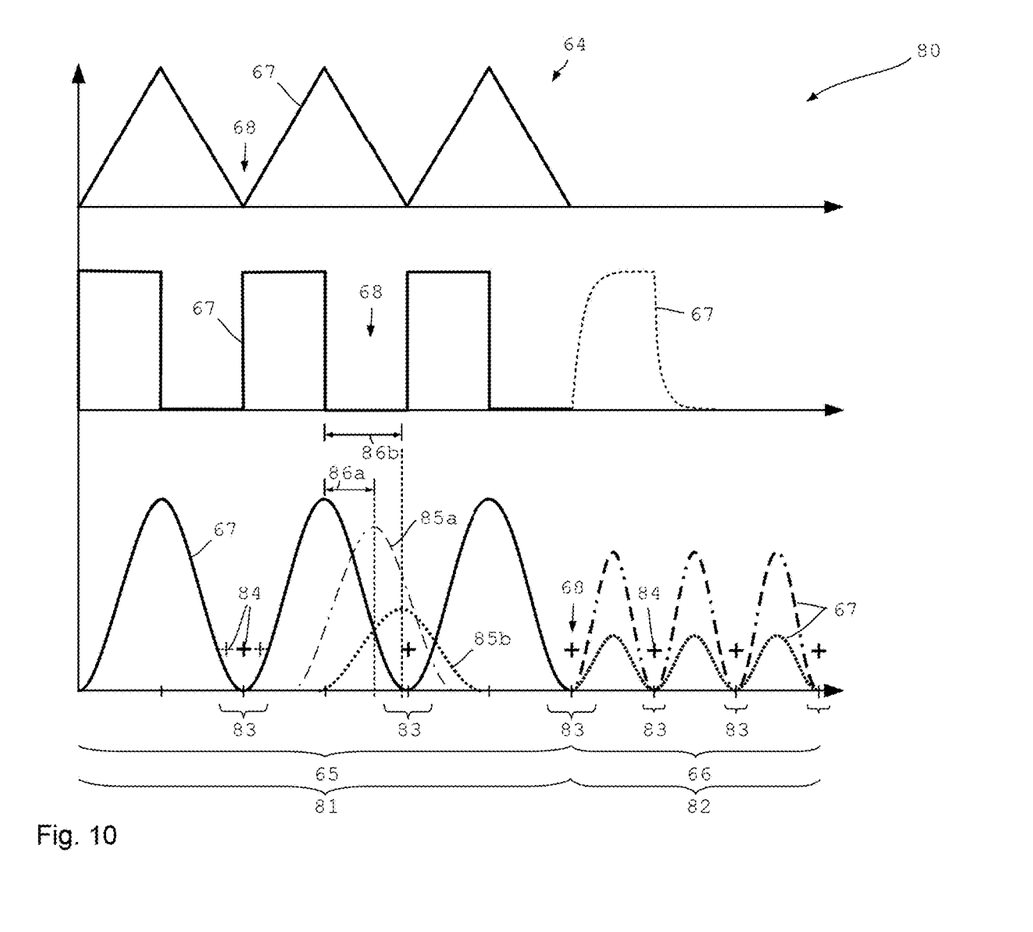
FIG. 10 schematically illustrated courses of the thermal power output through a measuring process.

FIG. 10 shows the intensity course of the thermal power during a measuring process 80. A variety of conceivable profiles of the thermal power 63 of a heat source are shown offset on top of one another.

The bottom curve shows the course of the radiation intensity 67 over time. The course is wave-like and, in particular, approximately sinusoidal. The thermal power 63 first shows an incremental increase, then it levels off, and after a maximum it drops off again. In a measuring interval 83, a thermal image of the section 3 of the bicycle component 1 is taken at a measuring point of time 84.

The measuring interval 83 is preferably provided in a time range in which less than the average thermal power of the heat source 60 is radiated toward the bicycle component 1. The thermal images 75 are, in particular, taken at a point in time 84, which is at the minimum or near the minimum of the thermal power.

One can clearly identify the periodic course of the thermal power across the first measuring section 81, in which the thermal power is varied within a frequency range 65. Here, the thermal power is varied at a first lower, presently constant, frequency (from a first frequency range 65).

After a certain quantity of periods the first measuring section 81 ends, immediately followed by a second measuring section 82, in which a periodically variable thermal power 63 is radiated at another, higher, and presently also constant, second frequency (from a second frequency range 66). Both the level or intensity of the thermal power may differ in the second measuring section 82 from the intensity of the thermal power in the first measuring section 81. At any rate, the thermal power 63 is varied at another frequency 66 in the second measuring section 82. In the exemplary embodiment shown, the frequency is higher in the second measuring section 82. The measuring point of time 84 is again selected so as to radiate a comparatively low thermal power.

In a concrete configuration according to the bottommost illustration in FIG. 10, the measuring time for a bicycle rim as the bicycle component is on the whole less than 1 minute and in a specific case for both sides at two frequencies, less than 1 minute in total, and specifically, about 40 seconds. The measuring time depends on the component and its structure.

A wavelike variation of the thermal power is possible and preferred. Alternately, an indexed operation of the heat sources 60 is possible. To this end, the heat sources 60 (see FIG. 8) may operate for example indexed and deliver either full power or no thermal power at all. This is shown in FIG. 10 by the second curve 67 of the radiation intensity. The course of the thermal power may be (nearly) square-waved. It is also possible to reach a nearly rectangular or square course, wherein at the pertaining shifting times the thermal power may have an exponential increase and an exponential decrease (see the illustration on the right at the end).

The top curve of the thermal power or radiation intensity 67 in FIG. 10 shows a triangular course, in which the power is linearly and continuously increased up to a maximum, while thereafter, the radiated thermal power 10 is reduced e.g. linearly, until a minimum is reached. Thereafter, the first period is repeated on a regular basis, so as to result in the illustrated triangular thermal power curve over time. An alternative is e.g. a sawtooth-like course. Other periodic courses are likewise possible.

It is also possible to provide for a gradual variation (increase and/or decrease) of the measuring frequency.

It was found that lower frequencies of the thermal power variations can resolve larger wall thicknesses in more detail, while higher frequencies of the thermal power variations can analyze thinner wall structures at higher resolutions.

Preferably, a sinusoidal radiation intensity variation of the heat sources is set, wherein the intensity starts at 0, reaches a maximum, and goes back to 0 (etc.). This may be defined as a complete period (examination interval). This is virtually a sinusoidal function shifted by 90°. The sinus begins in the minimum (−90° phase position) and ends in the minimum (in mathematical terms, at a 270° phase position).

Preferably, multiple measuring periods are used, lined up per frequency range or per frequency.

In all the configurations, the thermal images may be taken continuously or quasi-continuously. The (final) evaluation image derived therefrom, resolved across the surface of the bicycle component, represents the heat distribution. Thus, a plurality of images can be taken in different phase positions of the heat sources.

In all the configurations and specific embodiments it is also possible and preferred that the evaluation image reproduces the time delay (=phase position) of the measured temperature oscillation on the component body of the bicycle component, in relation to the periodic variation of the heat radiation of the heat sources (such as brightness). Thus, the time delay is a measure of the local heat capacity and thus, the wall thickness of known materials. A larger mass heats up slower locally, a thin wall or a stem, faster. Air pockets, foreign bodies or the like change the expected image and can thus be detected.

FIG. 10 is a simplistic illustration of the temperature profiles 85*a*, 85*b*, for a thinner spot 22 and a thicker spot 23. In a thinner spot 22, the acting heat radiation 67 of the heat source(s) 60 propagates faster, and due to the low local heat capacity, reaches a higher local maximum. The phase shift or phase difference 86*a* (time interval of the maxima or minima or flanks) is lower than in the thicker spot 23, where a temperature profile 85*b* forms. It shows lower maxima and a larger phase difference or larger phase shift 86*b* relative to the course of the acting radiation intensity 67.

These evaluations (phase difference and/or deviation of the maxima) are carried out spatially resolved across the surface of the bicycle component. To this end, a temperature profile 85*a*, 85*b* on the component body 9 of the bicycle component 1 is determined for different locations or spots 22, 23 etc. The local phase shifts relative to the course of the radiation intensity 67 of the heat source(s) 60 are computed. These evaluations of the phase shifts are very precise, since disturbances only rarely influence the fluctuation frequency. Non-recurrent influences can be, and are, deducted automatically. Finally, preferably an evaluation image (per frequency) is derived, in which the image pixel intensity is dependent on the local phase shift. A larger (smaller) wall thickness is represented by paler (darker) colors or higher intensities, or reversely.

Overall, the invention provides an advantageous facility 50, to examine, manually or optionally automated, the production quality of bicycle components 1. Checks on a regular basis or even individual inspections of all the products of a series manufacture are possible non-destructively. Subdividing the surface of a bicycle component in multiple sections or subsections enhances the measurement quality and to increase the inspection speed.

While a particular embodiment of the present facility or apparatus for and method of examining the quality of bicycle components have been described herein, it will be appreciated by those skilled in the art that changes and modifications may be made thereto without departing from the invention in its broader aspects and as set forth in the following claims.

| List of reference numerals: | |
| --- | --- |
| 1 | bicycle component |
| 2 | fibrous composite material |
| 3 | section |
| 4, 5 | subsection of 3 |
| 6, 7 | wall thickness |
| 8 | encoding, type code |
| 9 | component body |
| 10 | rim, bicycle rim |
| 11, 12 | rim side |
| 13 | rim base |
| 14 | rim well |
| 15 | rim flange |
| 16 | valve hole |
| 17 | hollow space |
| 18 | spoke hole |
| 20, 21 | segment |
| 22 | thinner spot |
| 23 | thicker spot |

-continued

| List of reference numerals: | |
| --- | --- |
| 50 | facility |
| 51 | control device |
| 52 | memory device |
| 55 | measuring device |
| 56 | deflecting device |
| 56a, 56b | mirror unit |
| 58, 59 | ray |
| 60 | heat source |
| 61 | radiation source |
| 62 | quartz lamp |
| 63 | thermal power, heat radiation |
| 64 | frequency |
| 65 | frequency range |
| 66 | frequency range |
| 67 | radiation intensity |
| 68 | minimum of 67 |
| 70 | camera, thermography camera |
| 71 | infrared camera |
| 72 | camera |
| 73 | filter unit |
| 74 | mirror element |
| 75 | image, thermal image |
| 76, 77 | evaluation image |
| 78 | image pixel |
| 80 | measuring process |
| 81, 82 | measuring section |
| 83 | measuring interval |
| 84 | measuring point of time |
| 85a, 85b | temperature profile |
| 86a, 86b | distance, phase difference |
| 90 | holding device |
| 91 | actuator |
| 92 | feeding device |
| 93 | delivery device |
| 94 | weighing device |
| 95 | encoder, encoding detector |
| 96 | reject storage |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar, handle |
| 107 | saddle |
| 109 | spoke |
| 111 | sprocket assembly |
| 112 | pedal crank |

The invention claimed is:

1. A facility for examining the production quality of bicycle components including at least one component body comprising at least one control device;
at least one heat source;
and at least one camera;
wherein the heat source is configured and set up to apply heat on at least one section of the bicycle component, time-controlled, during a measuring process;
and wherein the camera is set up and configured to capture and evaluate at least one spatially resolved thermal image of at least one subsection of the section of the bicycle component, to determine the production quality of the bicycle component by analyzing the thermal image; and
wherein the at least one control device is set up and configured to capture thermal images at a point in time in which the radiation intensity of the heat source is lower than an average radiation intensity of the heat source as applied to the at least one section of the bicycle component during the measuring process.

2. The facility according to claim 1, wherein the at least one control device and at least one heat source are set up and configured to output a thermal power which is periodically fluctuating/provided for time-controlled variations.

3. The facility according to claim 1, wherein the at least one control device is set up and configured to perform at least two measuring sections in the measuring process, wherein the thermal power in the two measuring sections is output in two different frequency ranges, wherein one of the frequency ranges shows lower frequencies than the other of the frequency ranges.

4. The facility according to claim 1, wherein at least one camera comprises sensors for spatial resolution, which are arranged in lines and/or columns, and wherein the camera in the infrared radiating area is light-sensitive.

5. The facility according to claim 1, wherein a plurality of images is taken during the measuring process, from which an evaluation image is derived, and wherein at least the evaluation image is stored in a memory device and is unambiguously assigned to the bicycle component.

6. The facility according to claim 1, wherein a spatially resolved local wall thickness of the bicycle component is represented in the evaluation image by way of the intensity of the image pixel.

7. The facility according claim 1, comprising at least one deflecting device for guiding heat radiation from the heat source toward the component body, and/or comprising at least one deflecting device for guiding heat radiation from the component body toward the camera.

8. The facility according to claim 1, wherein a holding device for the bicycle component is comprised for defined takeup of the bicycle component for the measuring process, and wherein at least one actuator is comprised, with which to automatically position the bicycle component,
and with which the bicycle component can be positioned in various positions, to capture different ranges or sides of the bicycle component, wherein a feeding device and a delivery device for bicycle components are comprised, wherein a weighing device is assigned to capture the weight of the bicycle component.

9. The facility according to claim 1, wherein an encoder is comprised, to apply a unique encoding on the bicycle component and/or to identify an encoding on the bicycle component, and wherein at least one image is evaluated to detect an encoding and to unambiguously identify the bicycle component.

10. The facility according to claim 1, wherein the facility is set up and configured to examine the production quality of bicycle rims and to completely capture at least the side surfaces of the bicycle rims.

11. A method for examining the production quality of bicycle components, comprising: at least one heat source supplying heat to at least one targeted section of the bicycle component in a facility with at least one control device;
wherein at least one camera takes at least one thermal image of at least one subsection of the section of the bicycle component;
wherein the thermal image is evaluated to determine the production quality of the bicycle component;
wherein a deflecting device deflects heat radiation to capture different sides of the bicycle component;
wherein at least one deflecting device is comprised which is configured to deflect heat radiation to capture different sides of the bicycle component; and
wherein the at least one control device is set up and configured to capture thermal images at a point in time in which the radiation intensity of the heat source is lower than an average radiation intensity of the heat source as applied to the at least one section of the bicycle component during the measuring process.

12. The method according to claim 11, wherein a periodically variable thermal power is applied on the section of the bicycle component, wherein a periodically variable heat radiation is applied on the section of the bicycle component at a first frequency range and thereafter at a second, different frequency range, wherein thermal images are periodically taken and stored in a buffer, wherein an evaluation image for the production quality of the bicycle component is derived from the thermal images.

13. The method according to claim 11, wherein spatially resolved temperature profiles on the component body of the bicycle component are determined, and assigned phase shifts of the corresponding temperature profiles to the course of the radiation intensity the heat source are determined, and wherein the intensity of the image pixel represents the local wall thickness of the bicycle component in the evaluation image.

14. A bicycle component with a component body, whose production quality was examined by a method according to claim 11.

15. The bicycle component according to the claim 14, wherein the component body comprises an encoding to which an evaluation image is unambiguously assigned.

16. A method for examining the production quality of bicycle rims, comprising: at least one heat source supplying heat to at least one targeted section of the bicycle component in a facility with at least one control device;
wherein at least one camera takes at least one thermal image of at least one subsection of the section of the bicycle component;
wherein the thermal image is evaluated to determine the production quality of the bicycle rim; wherein the component body is provided with a encoding, to which at least one thermal image and/or evaluation image is unambiguously assigned; and
wherein the at least one control device is set up and configured to capture thermal images at a point in time in which the radiation intensity of the heat source is lower than an average radiation intensity of the heat source as applied to the at least one section of the bicycle component during the measuring process.

17. The facility according to claim 1, wherein at least one deflecting device is comprised which is configured to deflect heat radiation to capture different sides of the bicycle component.

18. The facility according to claim 6, wherein the wall thickness of the bicycle component is reflected in a resolution inversely proportional to the frequency of the thermal power variations, with lower frequencies of the thermal power variations reflecting larger wall thicknesses in greater detail, and higher frequencies of the thermal power variations reflect thinner wall structures at higher resolutions.

\* \* \* \* \*